UNITED STATES PATENT OFFICE 1,955,065

DISPOSAL OF SEWAGE AND THE LIKE

Charles Gilbert Hawley, Chicago, Ill.

No Drawing. Application February 4, 1930, Serial No. 425,915

7 Claims. (Cl. 210—2)

This invention or discovery relates to improvements in and for the purification of liquids, especially the great volumes of intake waters and outfall waters respectively required and wasted by municipalities and large industries.

In direct contrast with the processes of sedimentation usually employed, this invention comprises a lifting or levitational process which is particularly designed to purify waters that are burdened with organic fluids and organic solids; and, whereby such waters may be clarified or purified much more quickly and with less dependence upon and interference by the biochemical actions and reactions characteristic of such impurities.

Such objectionable substances, usually grouped under the term suspended matters and including living organisms and the mineral oils frequently present in waste waters, do not yield readily or quickly to any of the known processes of removal or purification; and, in the effort to ensure proper conditions, municipal and industrial systems have been amplified and enlarged to the point of becoming economically burdensome. Further, the systems now in use ultimate in unwholesome and watery sludges that are of little value and very difficult to dispose of.

The purpose hereof is to overcome these limitations and to reliably purify such liquids more quickly than in the past; at much less expense for work construction and operation, and more flexibly in the matter of volumes; and, to obtain or recover from the foul water so treated both primary and by-products of such safety and utility as to additionally justify the general employment of purifying systems. Other objects will appear in relation to the practical adaptation of the invention to large and small requirements.

As will presently appear, the foregoing objects are attained by astonishingly simple forces and steps; and, as should be noted, by the avoidance of former steps and limitations; and may be satisfied by any one of several very simple treating systems or devices which, largely due to such eliminations, are comparatively small and inexpensive.

Being of chief interest because overcoming the greatest difficulties, the novel treatment of the worst outfall waters, to-wit, the treatment of sewage and the concurrent recovery and uses of sewage sludges will be first explained and described in detail; following which, brief attention will be directed to the purification of less impure intake waters; and then, incidentally, to the correlative and alternative uses for which some parts of the invention are suited.

Sewage reaches a treating plant at a velocity which prevents the deposition of the sewage matters; otherwise sewers would be too quickly clogged. The larger objects and floating matters are gotten rid of by screening or equivalently simple treatment of the sewage; and the heavier solids precipitate quickly whenever the velocity of the sewage stream is checked. Such steps are easily performed.

The real difficulties are encountered when the velocity is reduced to about one foot per second, for at that rate the organic or putrescible substances begin to settle out and are apt to become a nuisance and continue to be dangerous, even after being removed from the sewage stream. Indeed, the matter of collecting them becomes secondary to the matter of disposing of them safely.

Many of the putrescible matters persist in suspension even when the movement of the sewage stream is reduced to rates as low as one foot per minute, and, for effective treatment, the sewage must be long retained in tanks of sizes that will hold the sewage to these very slow rates of progress.

The sludges are precipitated upon tank bottom areas of great extent and it is both difficult and expensive to gather and remove them from the bottom of the treating tanks. Further, the sludges recovered are chiefly made up of water and the small percentage of actual sewage substances can only be disposed of after the carrying water has been evaporated at great cost of time and expense.

Whatever the physical, chemical, biochemical, or electrical action performed on the sewage, all present systems depend upon sedimentation as a means of intercepting the putrescible matters and preventing their escape at the outfall. This statement does not fully take into account those treatments which are calculated to perfect the work of somewhat restricted sedimentation tanks and by which after-treatments the impurities not disposed of in the sedimentation tanks are presumed to be so changed in character that they may be discharged into diluting bodies of water and not materially add to the putrescibility of the latter. After-treatments of this and other kinds may be resorted to for the improvement of the effluent from any treating system proper, including this present system, if need should arise.

Compared with the slow and uncertain systems of filtration and sedimentation now in use, this invention accomplishes both the separation and the safe disposal of the suspended or "non-settlable" matters at higher rates of movement and within smaller spaces and structures; and by reducing the costs of installation and maintenance makes the benefits of purifying both outfall and intake waters more easily available to all peoples. This forward step finds its basis in my discovery of the levitational process about to be described, which, acting rapidly and with greater certainty, may be safely substituted for the older systems; perhaps not wholly, but always with the effect of saving great sums of money; it appearing that the cost of constructing the tanks for and using the present invention will be as little as one-third of the cost of other systems approximating its efficiency.

I discovered that oil and especially the lighter mineral oils that are easily procurable and also commonly present in sewage, have a marked attraction or affinity for such organic substances as are found in sewage (or vice versa) and this invention comprehends and utilizes that discovery by definitely directing or forcing oils into engagement with the organic substances dispersed therein, thereby so increasing the buoyancy of the objectionable substances as to cause them to promptly rise to and remain upon the surface of the sewage stream; in other words, placing them within easy reach for purposes of removal. The subsequent steps of the process consist in removing the resulting oils, scums, or sludges from the surface of the stream, which involves the holding of some portion of that surface in a relatively quiescent condition that facilitates both the collection of the top sludges upon the stream surface and their removal therefrom.

In many modern cities, the oils contributed by the sewage will be adequate for the above defined process. Mineral oils predominate therein and serve to absorb, or amalgamate with, the organic oils, fats, greases, and soapy matters also contributed by the sewage, together comprising what is hereinafter termed "sewage oil". Generally speaking, all liquids which are neither soluble nor miscible in water and are of appreciably less weight, are comprehended, for the purposes of this invention, by the herein used word "oil". Sewage oils, animal, vegetable and mineral, and combined greasy and soapy scums, are all therein included.

The process is initiated by means of a previously collected quantity of sewage oil or by a freshly contributed volume of any readily available petroleum. Even unrefined or crude kerosene of the grade known as furnace oil performs most admirably in the manner above described, being of a viscosity which permits its ready subdivision and uniform dissemination in some part of the stream under treatment. Whatever the source or the character of the oil, when it is in any such manner mixed or diffused in or with the foul water, it quickly takes on or accepts the transfer of the latter's burden of suspended matters, both such as are fluid and such as are solid. In a very short time and notwithstanding the continuing forward movement of the sewage stream, the burdened oil appears upon the surface and the stream is left free to depart in a purified condition. The burdened oil may be decanted or removed either continuously or intermittently.

The degree of purification depends upon the thoroughness with which the extracting oil is disseminated within every part of the sewage stream, and best to ensure this juncture with the impurities, I prefer to perform the described step as nearly as possible at the surface of the stream, that is, upon the upper stratum thereof. To this end I momentarily distend the stream in a lateral direction, as by means of an elongated shallow weir and in the immediate neighborhood thereof, to-wit, within the zone defined thereby and using any suitable means for the purpose, purposely mix the oil with the foul water, disseminating it throughout the uniformly exposed and preferably shallow or localized stream formed by the presence of such water.

Further, by extending the system longitudinally the capacity of the weirs is so increased that very considerable variations of sewage flow are accommodated without so raising the level of the liquid as to intercept or disturb the operation of the process. This is of importance in handling storm waters.

Provision is included for the reception of any solids which may settle out while approaching the mixing region or zone next above described and by such localization of the liquids to be mixed, it is made certain that any suspended matters which do reach the mixing zone will be engaged by an assisting quantity of the oil there positioned. Thus the objectionable substances are conditioned to thereafter persist in floating to and upon the top of the sewage stream, and further are conditioned to resist re-absorption by that stream.

I have devised numerous appliances for the mixing of oil with the sewage, both below and at the surface of the sewage stream, and it is obvious that the oil may be directed, driven, jetted, sprayed, propelled, stirred, shaken, or poured into the stream and without reference to the manner of mixing and fully accomplishing the purposes of this invention provided the means employed effectively spread, diffuse or disseminate the oil within the sewage or other major liquid. But of all the ways and means considered and devised up to this time, the best arrangement and device for the purpose of mixing the major and minor fluids appears to comprise a rotary element (best resembling a street sweeper brush or a substituted cylindrical rotor) having an axis paralleling the overflow weir described and having its lower part submerged in the liquid which rises above that weir. Such a device repeatedly forces the oil and water into intimate contact and ensures the quick transfer of the impurities to the oil.

The mixing of the oil with the sewage, whether at the surface or below the surface, the timing of the action to permit the engaged and lightened substances to rise to the surface, and the removal of the scum or befouled oil, herein termed oil sludge, may be performed in a variety of ways and by any such means as are next above suggested and others that will suggest themselves to those who are skilled in this and allied arts, and I shall specifically describe only those ways and devices which seem to be the simplest and the best suited to the performance of all of the steps which are desirable in the treatment of sewage of the most difficult kinds, and which will ensure proper treatment thereof within the least space and at the least costs.

The described sewage spreading action or weir is most advantageously combined with an elongated sedimentation tank or trough which parallels such weir. The sewage stream, moving rapidly as aforesaid, enters the end of the trough and expends its force therein; so that at all times the surface of the liquid in the trough is relatively quiescent and, hence, is maintained at uniform level from end to end of the sewage spreading or exposing weir. By merely extending the weir end and trough the working capacities of the system are quickly elongated.

The velocity of movement of the sewage stream within the reception trough is proportional to the volumetric capacity of the trough and its weir or outfall. By preference, the velocity is thereby reduced to such an extent that considerable sedimentation takes place in the reception trough. However, either of two methods may be followed. First, the receiving trough may be so proportioned that sedimentation is denied to even the heavier organic or putrescible substances, leaving the oil to intercept them. Second, the velocity of the distributive movement toward the weir may be made so low as to ensure the subsidence of many putrescible matters in advance of the levitational treatment.

The latter alternative seems preferable in view of the oily sludges made available as above described and which are now mixed with any partially dehydrated sedimetary sludge and the whole burned. By that simple procedure, all bacterial problems are solved and all combustible matters recovered from the sewage are utilized. Incidentally the heat of such combustion will, in turn, be utilized to the further advantage of the community.

It is of marked advantage that the organic sewage matters are gathered within the compass of a relatively small volume of oil and, being thus closely localized, become easy to manipulate; all of which is in marked contrast to the wide distribution of the sludges formed in other systems. And the natural exclusion of practically all water renders the sludges easily disposable by heat; a great improvement over the watery and difficultly disposable sludges recovered from other systems.

The miscibility of vegetable, animal and mineral oils, ensures the retention of the putrescible or organic oils in the latter, like joining like, and fortunately all, though with varying efficiencies, are capable of exerting the described interceptive and extractive forces upon the other suspended matters in the sewage.

In practice it has been found that the oil sludges from this new system, though in some cases retaining considerable percentages of water, nevertheless burn very freely and give off proportionate heats. And the heavier sludges, which remain after much of the oil has been extracted from the oil sludge, also burn very freely.

The oil itself, insofar as it is of mineral origin, serves to suppress bacterial growth and is valuable on that account. Further, any suitable germicide may be added to the oil, to increase the toxicity thereof.

The burning of any of these simple or combined sludges as here described, presents both the most practical and the most effective means of finally terminating all organic life in the matters recovered from the sewage system. Alternatively, the oil sludges of this system are to be subjected to distillation or other reduction which will likewise destroy the organisms and also serve the purpose of improving, separating, or best taking advantage of the several constituents of the sludges.

The mixing of settled or sedimentary sludges with the oil sludges hereof for the purposes of combustion or other reduction should depend upon examination of the settled sludges, for any settled sludges that are sufficiently innocuous may be disposed of more directly and without heat.

A low degree of quiescence, involving only a brief retention subsequent to the described mixing of the oil and the sewage, permits the rise and collection of the burdened oils upon the surface. Further, by providing a submerged outlet for the clarified sewage, the befouled oils may be permitted to accumulate upon a relatively quiescent surface, and, to any depth desired. Indeed, through the use of such a submerged outlet, a body of oil sludge may be, and preferably is, maintained in position to receive the freshly admixed oil and sewage as rapidly as the mixture occurs, such standing body of befouled oil thus becoming both a mechanical convenience and serving as a filtering and cushioning medium whereby the quiet separation of the freshly mixed sewage and befouled oil is better ensured. Though not primarily essential, this step may best be used as a part of the working process.

While it is difficult to dislodge from the oil the solids which it receives as above described, they nevertheless quickly settle to the bottom of the oil containing them and when succeeding films or sludge scums accumulate upon the stream as next above described, or when the sludges are recovered from the stream and trapped in a convenient sludge tank made to contain a body of considerable depth, the solids will be found at the bottom of that body or mass of oil, and the oil at the top of that mass will be substantially clear. This further discovery is utilized herein as a means of returning oil to the system for re-use; and, being re-mixed with freshly entering sewage, such recovered oil again performs the service of grasping, absorbing, and extracting objectionable sewage matters.

As will be found most desirable, the befouled oil or sludge taken or skimmed from a relatively quiescent surface of the departing sewage stream. To accomplish this effectively, the film or surface layer of water directly supporting the sludge is also skimmed from the stream. Momentarily a mixture of oil sludge and a small quantity of water takes place and preferably that mixture is immediately discharged or poured into a sludge tank which is adjacent the described sewage reception trough or distributor and which has its bottom in open communication therewith.

As will be obvious, the oil and water quickly stratify in the described sludge tank and reciprocable levels are maintained in the subconnected tank and trough, due to the settling and return of the sludge included water into the lower part of the reception trough. Thus, as the oil becomes clear (through the settling of the solids therein as above described) it becomes possible to return or discharge the cleared oil from the top of the sludge tank and into the reception trough by gravity, thereby advantageously completing the cycle of oil use, separation and return, and without resort to any machinery for so doing.

Obviously other means may be used to accomplish the separation and return of the oil; for example an independent sludge tank equipped with mechanical means for transferring the several liquids. Clearly still other methods may be followed in disposing of the oil sludges but the gravitational methods above described seem to be the more reasonable.

It will now be clearly seen that the excess of collected oil and the thick sludges are to be separately withdrawn from the system and are to be disposed of in either or all of the ways above indicated, or otherwise if desired. Likewise, when the supply of clear oil in or from the sludge tank is in excess of the amount required by the system, the excess quantities of clear oil having once performed the separating functions, are withdrawn from the sludge tank and converted to an extraneous use.

The collection and gravity separation of the oil sludges in a subconnected sludge tank or pocket being undestood, an optional alternative method of procedure may now be disclosed. To repeat, the somewhat watery surface sludges are best poured into a sludge tank wherein the water and oil separate, leaving the heavier sludges entrapped in the lower part of the accumulated oil mass, and eventually providing clear oil which passes back into the system from the top of the oil mass. This is but another way of saying that the sludge tank is constantly relieved of water at the bottom and of clear oil at the top, while the accumulating solids are retained in the sludge tank; and, unless sludges are earlier removed therefrom, the time comes when the quantity of solids thus accumulated in the tank exceeds the capacity of the encasing oil to hold it, and thereupon the sludges begin to settle to the bottom of the tank. Arrangements are provided for withdrawing such settled sludges; and preferably along with any sludges that accumulate in the reception trough, for thus a single sludge removing mechanism or drag chain may be made to ultimately take care of all grades of the sewage-borne matters except the oils.

Present indications are that the settling oil-collected solids next above described contain sufficient inflammable matter to enable or aid in the direct combustion thereof, but obviously any desired quantity of oil may be added to the settled sludges for that purpose, particularly as in most cases the oils will be derived from the sewage and hence are available without cost.

It has already been determined that the process of levitational purification utilizing oils as here described, may be carried on at stream velocities, which are from three to five times faster than those that are observed in equivalently efficient processes of the older kinds; in other words, at velocities that would defeat ordinary processes and within spaces and structures of very much smaller size. By reason of the foregoing, the mechanical operations incident to the described process will be seen to be obviously simple; and it should be apparent that the operation thereof may be conducted with a minimum of manual and skilled attention.

In dealing with sewage that contains enough light mineral oil to hold the viscosity of the treating oil within the range permitting the best dissemination thereof in the water in the mixing zone, no diluting oils need be added, but if the heavier oils and fats predominate, the lighter oils may well be added and will usually improve the operation.

It is of importance that from the moment the sewage enters this process it is rendered odorless and in large measure is hidden by the described coverings of oil upon the stream under treatment. Further the oil covering renders that surface of the stream immune from the living organisms that so annoyingly attend the operation of some other systems; and again, a thick body or layer of oil upon the sewage surface successfully defeats the formation of the hard scums so objectionably present in certain older systems.

The tanks or troughs employed in carrying out this invention will usually be arranged at ground level and being extensive, in most cases are to be roofed or covered as a means of defending them from wind disturbances and to reduce any fire hazard that may attend the presence of the oils; also, more uniform temperatures are ensured by the inclosure of the treating plant or system.

It should be understood that this invention may be practised by the batch method; in other words, a given volume of sewage may be trapped in any suitable receptacle and the necessary oil, one per centum or less is adequate, may be shaken or stirred or otherwise distributed throughout the batch to intercept or engage the suspended substances; and when the batch is permitted to rest, those substances will accompany the oil, rising quickly to the surface of the batch. It then remains to separately decant the oil and water and to dispose of and re-use the resulting oil sludge. This is offered as a means of enabling others to practice the invention upon a small scale and to assure themselves of the accuracy of the foregoing statements, rather than as a suggestion of a method likely to be found practicable in the service of any municipality. As a rule, the requirements of any considerable community necessitate the treatment of the sewage while in a state of flow, as hereinbefore described.

The foregoing specification of oil as a sewage purifying agent contrasts sharply with the fact that up to this time every tendency has been to exclude oils from sewage. All oils have been regarded as nuisances because it has been difficult to effectively separate them from sewage and they have seriously interfered with the orderly procedure of the sewage disposal systems which were in use. Indeed, rules and laws have been enacted in the hope of lessening and preventing the wastage of oils into sewers, public convenience being necessarily ignored. While this invention does not urge the dumping of highly volatile oils into sewers, all others, and even mixtures of heavy and light oils may now be freely contributed to the sewers served hereby and will be both recovered and made use of to accomplish the work of sewage purification. In brief, the substances hitherto regarded as nuisances are converted into valuable municipal assets and sources of income.

The treatment of intake waters which require purification is conducted identically as above described except that the oil used may best be of a kind which will not impart objectionable odors or flavors to the water. In dealing with some industrial waters, less care need be exercised in this regard, but waters intended for domestic use should be guarded by the employment of oils which are virtually tasteless and odorless. Such oils are available in the open market but I have here found a source from which they may be derived more cheaply, as follows.

As a result of actual practice, I discovered that oils, such as petroleum, having a pronounced odor and which impart a strong flavor to water brought in contact therewith, are cleansed of odor and taste by washing or leaching them with sewage; that is, by using them in the process above described. Apparently the sewage matters that contact the oil during the conduct of this process extract the constituents which are responsible for objectionable odor and flavor. In consequence of this discovery, the present invention comprehends the purification of intake waters in accordance with said process and by the use therein of such sewage-leached or sewage-purified oils. The very oils which are recovered from or applied to the treatment of sewage and which are so greatly befouled by that process, are thereafter abstracted and clarified or refined, and thus provide water purifying oils of the highest order. Said sewage befouled and yet improved oils are purified by known processes of filtration and distillation and when so purified are applied to the purification of intake waters; even drinking waters.

The levitational process hereinbefore described is capable of employment in the clarification of liquids other than water, it being hereby pointed out that a major quantity of almost any liquid which is burdened with impurities of approximately its own specific gravity may be freed from such difficulty recoverable matters by uniformly admixing the liquid with a minor quantity of a fluid which has an affinity for these impurities and which becoming attached thereto is of sufficient lightness to ensure its own rise and the rise of the attached impurities, the mixture being permitted thereafter a period of relative quiescence.

The employment of coagulants will be found desirable as a preparatory agency in the treatment of liquids containing matters in a colloidal state. For example, by so treating any cloudy effluent from the herein described process it may be conditioned for an immediate repetition of this process, wherein the sustaining capacity of the oil is used to intercept and retain the coagulated masses or agglomerated substances. I have found the oil to be extremely effective in this regard and almost instantaneous in effect.

Many sewage disposal systems in present existence have come to be too small to meet the demands upon them. The present invention may be interpolated in or added to existing systems for the purpose of extending the capacities and utilities thereof by lessening the work to be done thereby, either reducing the loads thereon or perfecting the work thereof.

The obvious utility of this discovery or invention has few, if any, structural limitations and may be enjoyed in many kinds of apparatus both old and new.

This present application will at once be identified with my former applications, S. N. 334,721, filed January 24, 1929 and S. N. 369,288 filed June 8, 1929, holding many features and elements in common therewith.

Having thus described my invention I claim as new and desire to secure by Letters Patent:—

1. The herein described process of purifying a moving stream of water which contains putrescible impurities of substantially its own specific gravity, that consists in forcibly mixing a major stream of such water with a minor quantity of oil that is lighter than the same and which has an affinity for said impurities, thus causing the engagement of said impurities and the lighter liquid and thereby causing the simultaneous rise of both to the surface of the water, and, separating the resultant mixture of impurities and light liquid from said flowing liquid, and permitting the departure of the purified stream.

2. The herein described process of purifying waters which contain putrescible organic matters, that consists in admixing a major quantity thereof with a minor quantity of oil, and thereby causing the engagement of said matters with the oil, permitting the rise of the engaged matters to the surface of the water, and, separating the befouled oil from the water.

3. The herein described process of purifying waters which contain putrescible organic matters, that consists in admixing a major quantity thereof with a minor quantity of oil and thereby causing the engagement of said matters with the oil, permitting the rise of the organic matters and oil to the surface of the water, separating the befouled oil from the water, retaining in a portion thereof the matters intercepted thereby and returning and mixing the excess of oil with a further quantity of said water.

4. The herein described process of purifying flowing waters which contain putrescible organic matters in suspension, that consists in admixing a major quantity thereof with a minor quantity of oil and thereby causing the engagement of said matters with the oil, permitting the rise of the engaged matters to the surface of the flowing waters along with the oil, separating the befouled oil upon the surface of the stream, and, removing the same therefrom, while permitting the escape of the purified water.

5. The herein described process of purifying flowing waters which contain putrescible organic matters in suspension, that consists in admixing a quantity thereof with a quantity of oil and thereby causing the engagement of said matters with the oil, permitting the rise of the engaged matters to the surface of the flowing water along with the oil, separating the befouled oil upon the surface of the stream, and removing the same therefrom in company with a minor quantity of water from said surface, while permitting the escape of the purified water.

6. The herein described process of purifying flowing liquids which contain putrescible organic matters, that consists in admixing a quantity thereof with a quantity of oil and thereby causing the engagement of said matters with the oil, permitting the rise of the engaged matters to the surface of the flowing liquid along with the oil, separating the befouled oil upon the surface of the stream, and while permitting the effluence of the purified liquid, removing the befouled oil and a minor quantity of said liquid from the surface of the effluent stream, trapping and separating the components of such minor mixture, meantime returning the excess of said liquid and oil to the influent stream.

7. The herein described process of purifying flowing waters which contain putrescible organic matters, that consists in admixing the water with oil and thereby causing the engagement of said matters with the oil, permitting the rise of the engaged matters to the surface of the flowing water along with the oil, maintaining a mass of befouled oil upon the surface of the stream for the cushioning reception of the freshly mixed oil and water, thereafter separating the excess of the befouled oil upon a surface of the stream, and while permitting the passage of the purified waters removing said excess of befouled oil from the surface of the effluent stream.

CHARLES GILBERT HAWLEY.